(12) United States Patent
Cendrillon et al.

(10) Patent No.: US 7,995,528 B1
(45) Date of Patent: Aug. 9, 2011

(54) PRECODING WITH MULTI-USER CODEBOOKS

(75) Inventors: Raphael Cendrillon, Kennedy Town (HK); Yu-Ngok Li, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 178 days.

(21) Appl. No.: 12/167,788

(22) Filed: Jul. 3, 2008

Related U.S. Application Data

(60) Provisional application No. 60/950,453, filed on Jul. 18, 2007.

(51) Int. Cl.
*H04W 4/00* (2009.01)
(52) U.S. Cl. .......................... 370/329; 370/437; 370/465
(58) Field of Classification Search .......................... None
See application file for complete search history.

(56) References Cited

U.S. PATENT DOCUMENTS

| | | | |
|---|---|---|---|
| 2007/0049218 A1* | 3/2007 | Gorokhov et al. | 455/102 |
| 2007/0155336 A1* | 7/2007 | Nam et al. | 455/69 |
| 2007/0249402 A1* | 10/2007 | Dong et al. | 455/562.1 |
| 2008/0004076 A1* | 1/2008 | Adachi et al. | 455/560 |
| 2008/0080637 A1* | 4/2008 | Khan et al. | 375/267 |
| 2008/0117867 A1* | 5/2008 | Yin et al. | 370/329 |
| 2008/0292012 A1* | 11/2008 | Kim et al. | 375/260 |
| 2008/0299917 A1* | 12/2008 | Alexiou et al. | 455/103 |
| 2009/0129286 A1* | 5/2009 | Beser | 370/252 |
| 2009/0310586 A1* | 12/2009 | Shatti | 370/338 |

* cited by examiner

*Primary Examiner* — Robert C Scheibel

(57) ABSTRACT

A cellular system utilizes different codebooks of precoding vectors for different receivers within a particular cell. A set of different codebooks is designed and then used by a base station as a basis to allocate to various receivers in a dynamic fashion. In at least some embodiments, the codebooks are designed to be non-overlapping in angular space. For example, codebooks can be designed to be generally orthogonal to one another thereby increasing the separation between receivers that use the different codebooks. In at least some embodiments, codebooks can be allocated responsive to a determination that two or more receivers are geographically proximate one another in a manner which would permit an undesirable amount of interference. In yet other embodiments, codebooks can be allocated in a more random fashion.

20 Claims, 11 Drawing Sheets

PRECODING WITH MULTI-USER CODEBOOKS

RELATED APPLICATIONS

This application claims priority to U.S. Provisional Application Ser. No. 60/950,453, filed on Jul. 18, 2007, the disclosure of which is incorporated by reference herein.

BACKGROUND

Beamforming is a commonly used technique in the downlink of advanced cellular systems such as 3G Long-Term Evolution (3G LTE) and Worldwide Interoperability for Microwave Access (WiMAX) systems. Beamforming uses coordinated transmissions across multiple transmit antennas at a base-station in order to direct a signal towards the intended receiver, typically a mobile receiver. The use of beamforming with a narrow beam helps to ensure that the signal strength at the mobile receiver is high, while at the same time ensures that interference caused to receivers at other locations within a particular cell is kept to a minimum.

Setting the coefficients of a beamformer requires channel knowledge at the base station. Specifically, the channel is measured at the receiver and measurements are fed back to the base station over the uplink. Feeding back the entire channel measurement typically requires too much overhead, so in practical systems the receiver generally measures the downlink channel and then selects a beamforming or 'precoding' vector p from a finite set of precoding vectors $\psi = \{p_1, \ldots, p_N\}$ known as a codebook. This codebook is typically designed offline and is known to both the base station and the receiver. As a result the receiver only needs to feed back the index of the selected precoding vector, thus significantly reducing feedback overhead.

Consider, as shown in FIG. 1, a cell with two receivers, Receiver a and Receiver b and an associated base station. The channel row vector from the base station to Receiver a is denoted as $h_a$, where the nth element contains the channel from the nth transmit antenna at the base station to the receiver's antenna. Note that in general there may be multiple antennas at the mobile receiver in which case $h_a$ and $p_a$ will be matrices. Similarly, denote $h_b$ as the channel row vector from the base station to Receiver b. If precoding is applied, the signal transmitted by the base station will be as follows:

$$x = p_a x_a + p_b x_b,$$

where $p_a$ and $p_b$ denote the precoding column vectors of Receivers a and b, and $x_a$ and $x_b$ denote the signals intended for Receivers a and b respectively. The signal received by Receiver a is then as follows:

$$y_a = h_a p_a x_a + h_a p_b x_b + z_a$$

which leads to a signal to interference plus noise ratio (SINR) as follows:

$$SINR_a = \frac{|h_a p_a|^2 S_x}{|h_a p_1|^2 S_x + S_z},$$

Ideally one would like to choose the precoding vector for Receiver a, $p_a$ to be parallel to $h_a$ so that the signal power at Receiver a is maximized. At the same time, one would like $p_a$ to be orthogonal to $h_b$ such that the interference caused to Receiver b is minimized.

Unfortunately, when Receivers a and b are in close vicinity to one another, $h_a \approx h_b$ and it becomes difficult to find a precoding vector that satisfies both criteria. Seen another way, the codebook which contains the set of available precoding vectors may not have a fine enough granularity in angular space to allow the signals intended for the two receivers to be adequately separated. For example, consider transmission with a 4 element (2-bit) codebook as shown in FIG. 2.

In this case one can either transmit to Receiver a using $p_1$, which will cause severe interference to Receiver b, or transmit to Receiver a using $p_2$, which will decrease the interference to Receiver b, but will also cause Receiver a to receive an extremely weak signal since it is located far outside of the main lobe of $p_2$.

One solution to this problem is to increase the codebook size, as diagrammatically indicated in FIG. 3, thereby increasing the number of beams and achieving a finer granularity in angular space. This allows the receivers to be adequately separated, but unfortunately this approach requires a higher feedback overhead and increases the complexity of precoding vector selection at the receiver.

SUMMARY

This Summary is provided to introduce subject matter that is further described below in the Detailed Description and Drawings. Accordingly, the Summary should not be considered to describe essential features nor used to limit the scope of the claimed subject matter.

In one embodiment, a system comprises a base station configured to wirelessly communicate data to a plurality of receivers in a cell associated with the base station; multiple different codebooks, each codebook providing a set of precoding vectors that are used to provide individual beam patterns within the cell; and wherein the base station is further configured to allocate different codebooks to different receivers within the cell.

In yet other embodiments, a computer-implemented method comprises ascertaining that a plurality of receivers are within a particular cell; allocating different codebooks to different receivers within the cell, each codebook providing a set of pre-coding vectors that are used to provide individual beam patterns within the cell; and notifying individual receivers of corresponding codebooks that are to be used.

Other embodiments provide means for ascertaining that a plurality of receivers are within a particular cell; means for allocating different codebooks to different receivers within the cell, each codebook providing a set of pre-coding vectors that are used to provide individual beam patterns within the cell; and means for notifying individual receivers of corresponding codebooks that are to be used.

BRIEF DESCRIPTION OF THE DRAWINGS

The same numbers are used throughout the drawings to reference like features.

DETAILED DESCRIPTION

Overview

In one or more embodiments, a cellular system utilizes different codebooks of precoding vectors for different receivers within a particular cell. A set of different codebooks is designed and then used by a base station as a basis to allocate to various receivers in a dynamic fashion. In at least some embodiments, the codebooks are designed to be non-overlapping in angular space. For example, codebooks can be designed to be generally orthogonal to one another thereby increasing the separation between receivers that use the different codebooks.

In at least some embodiments, codebooks can be allocated responsive to a determination that two or more receivers are geographically proximate one another in a manner which would permit an undesirable amount of interference. In yet other embodiments, codebooks can be allocated in a more random fashion.

In the discussion that follows, a section entitled "Operating Environment" is provided and describes one example operating environment in which one or more embodiments can be employed. Following this, a section entitled "Example Transmitter" is provided and gives an example of a transmitter in accordance with one or more embodiments. Next, a section entitled "Example Receiver" is provided and gives an example of a receiver in accordance with one or more embodiments. Following this, a section entitled "Implementation Example" is provided and describes an example implementation in accordance with one or more embodiments. Following this, a section entitled "Example Receiver Environments" is provided and describes various example receiver environments in accordance with one or more embodiments.

Operating Environment

Figure 1:
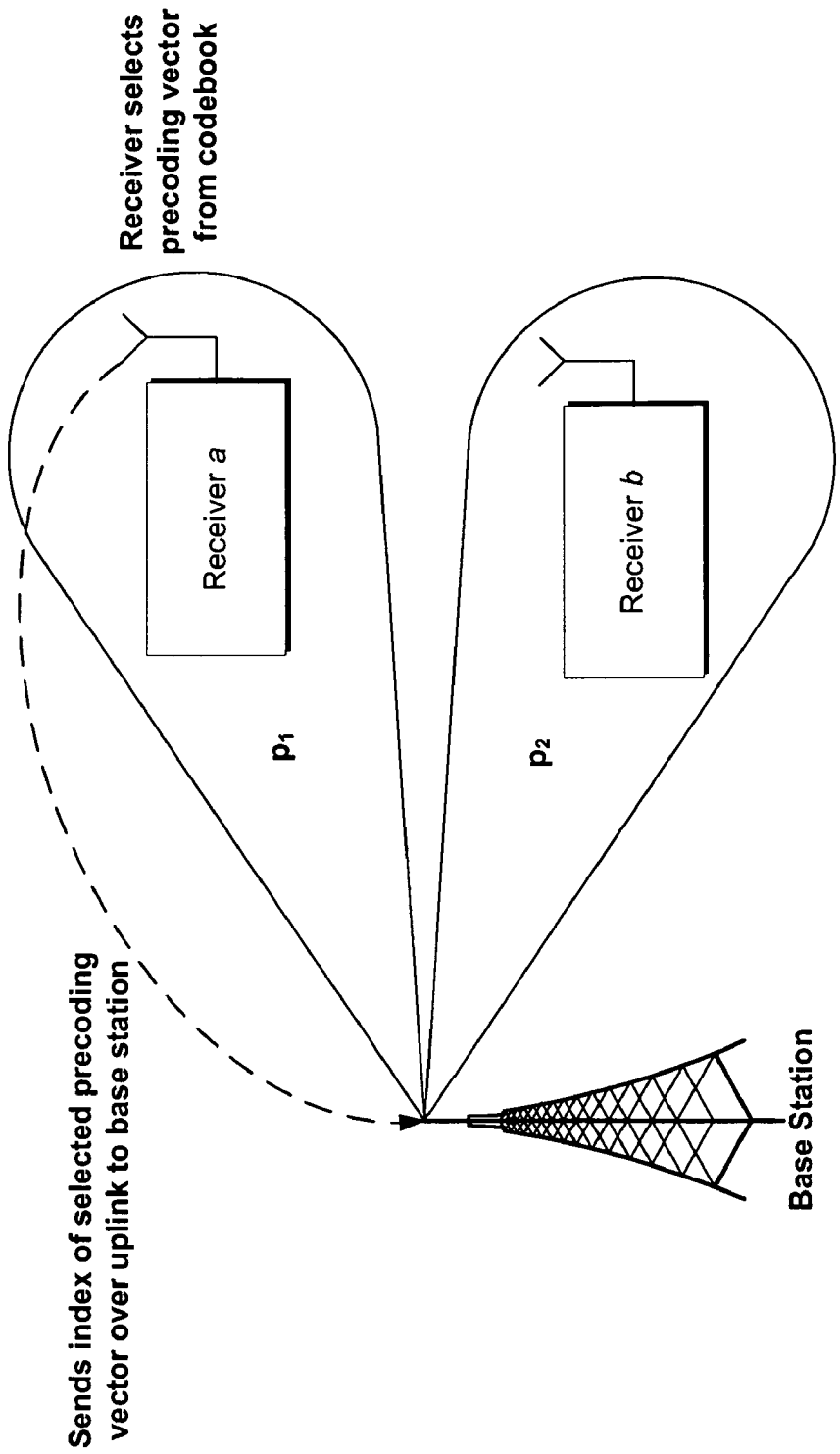
FIG. 1 illustrates a base station and two receivers.
Figure 2:
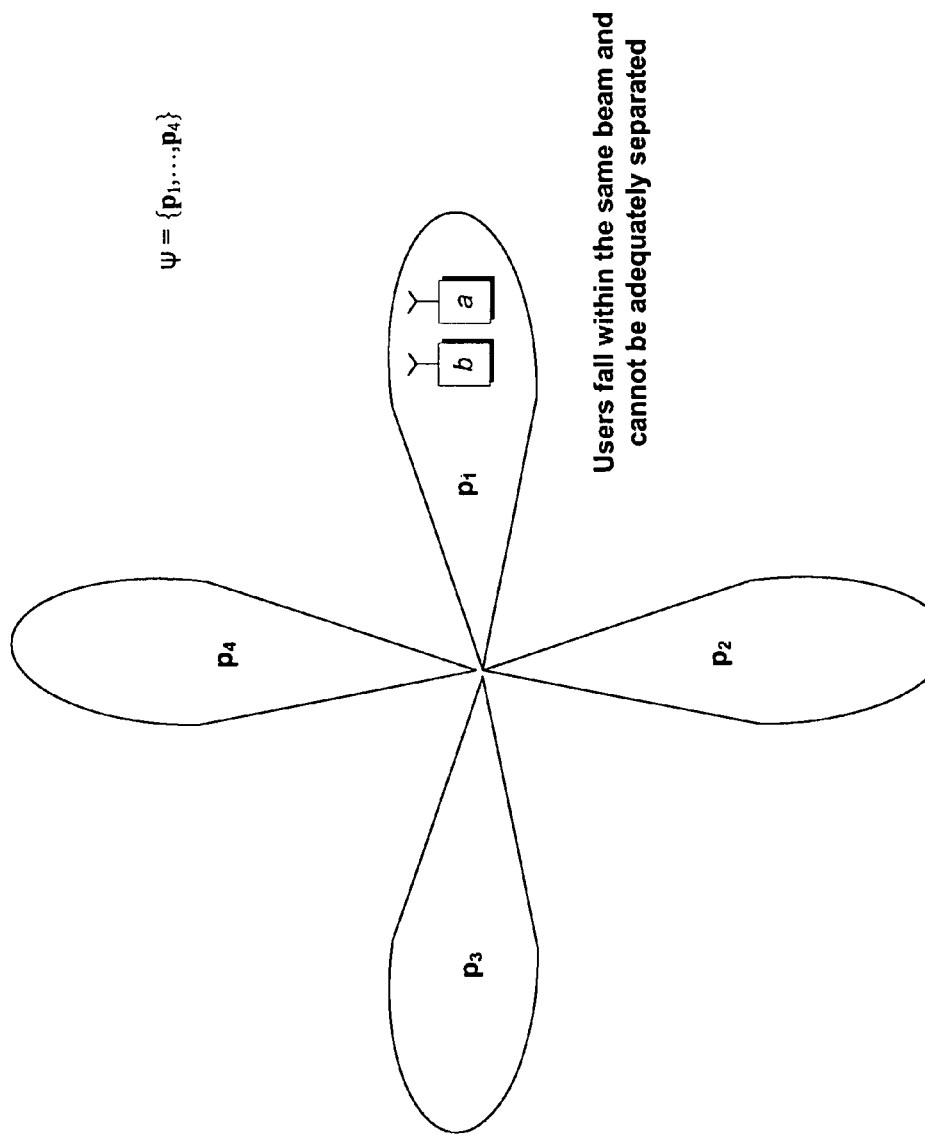
FIG. 2 illustrates transmission with a 4-element codebook.
Figure 3:
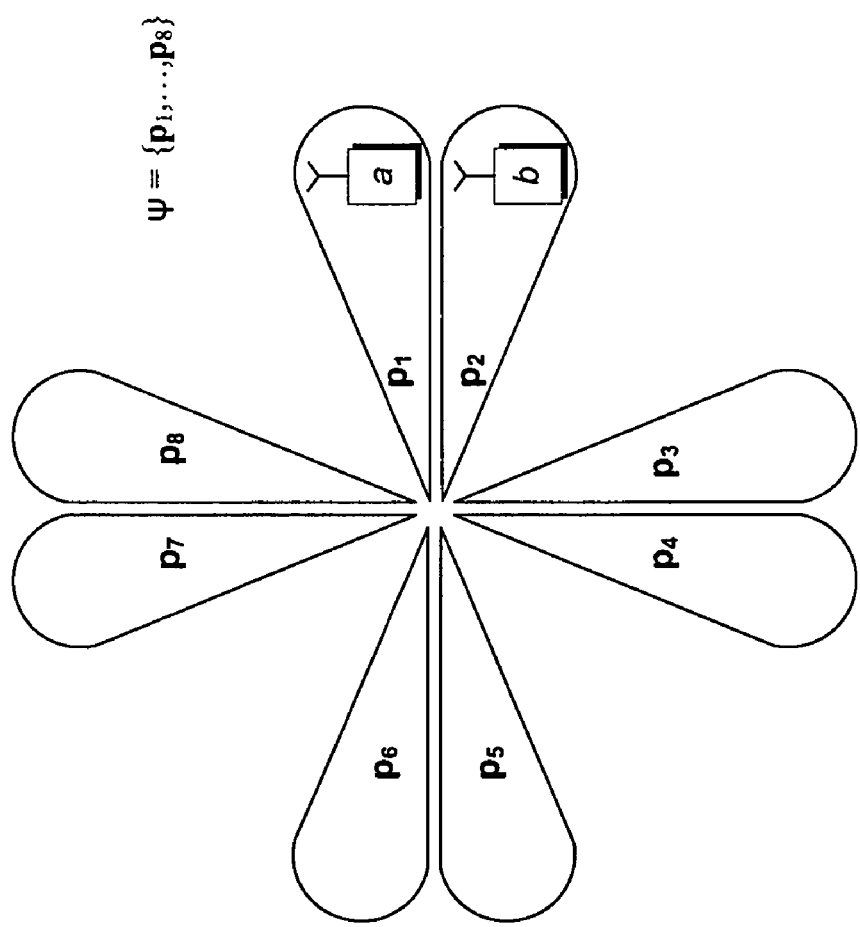
FIG. 3 illustrates transmission, as in FIG. 2, only with a larger codebook.
Figure 4:
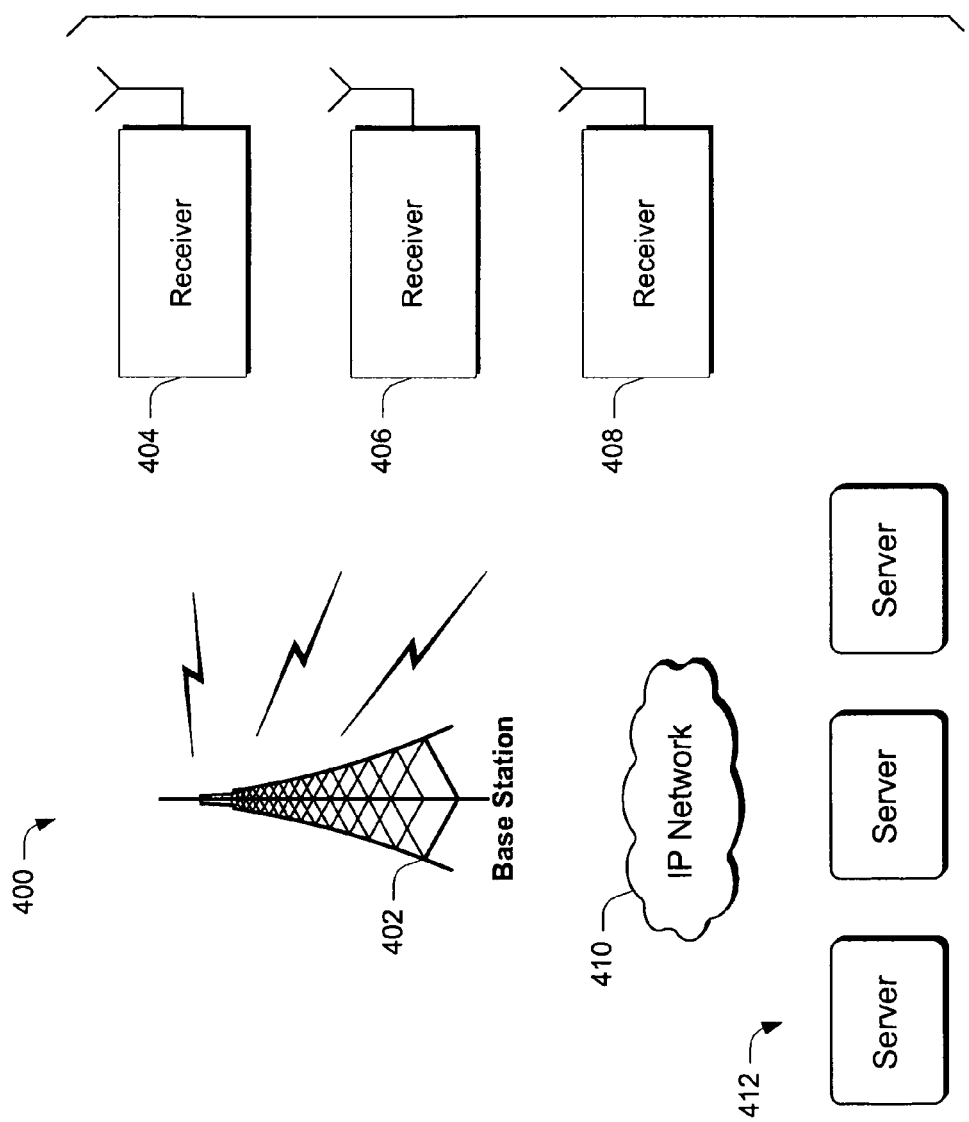
FIG. 4 illustrates a system in accordance with one or more embodiments.

FIG. 4 illustrates a communication system in accordance with one or more embodiments generally at 400. In the illustrated and described embodiments, communication system 400 can work in connection with any suitable wireless or cellular system. By way of example and not limitation, communication system 400 can work in connection with 3G Long-Term Evolution (3G LTE) and/or Worldwide Interoperability for Microwave Access (WIMAX) systems. Typically, such systems include one or more base stations that transmit and receive signals from one or more receivers. In at least some instances, the receivers are mobile receivers that can move within a particular transmission cell. WIMAX is typically used in a number of scenarios including, by way of example and not limitation, Voice over IP or "VoIP", TCP/IP, and with applications having different quality of service or QoS requirements, as will be appreciated by the skilled artisan.

Communication system 400 includes, in this example, one or more base stations 402 and multiple receivers 404, 406, and 408. Base stations can be connected to an IP network 410 via a gateway (not shown). Base station 402 can, and typically does include multiple transmit antennas that are used to effect transmissions to the receivers. The IP network can include various special and general purpose servers shown generally at 412. Elements within both the base stations and receivers are configured with processors, memories, instruction sets and the like, that implement the functionality described in this document. Typically, communication that takes place within the system goes through base station 402. The base station is responsible for allocating bandwidth and can typically handle many receivers. In at least some embodiments, base station 402 is implemented as a WIMAX tower, which is similar in concept to a cell-phone tower. A WIMAX tower can provide coverage to a very large area, e.g., 8000 square kilometers.

Receivers can include, by way of example and not limitation, receivers such as those that are associated with residential and business customers. The receiver and associated antenna(s) can be embodied in a small box or PCMCIA card, or can be embodied in some type of computing device such as a laptop computer, notebook computer, desktop computer, mobile device and/or a handheld computing device to name just a few. Of course, the receiver can be embodied in other types of computing devices without departing from the spirit and scope of the claimed subject matter.

Communication system 400 includes two types of communication links. A downlink is used for communication from the base station 402 to the receivers 404, 406, and 408. An uplink is used for communication from the receivers to base station 402.

Communication system 400 utilizes the base station 402 to communicate data, such as packets and/or other information, to the various receivers. Any suitable data format can be used, as will be appreciated by the skilled artisan. When individual receivers boot up, each can register with the base station. The base station can serve to exchange messages with the receivers located in a corresponding service cell, authenticate and register receivers via one or more servers in the IP network, transmit service request messages from the receivers to the IP network, and transmit packets from the IP network to the receivers, and so on.

As noted above, in one or more embodiments a base station has at its disposal multiple different codebooks that can be allocated to receivers within a particular cell. The codebooks each provide a set of precoding vectors which define coefficients that are utilized to provide a beam pattern. By using the different codebooks, different beam patterns can be defined. The different codebooks can then be assigned or allocated to different receivers within the cell in order to reduce interference between transmitted signals by virtue of using different beam patterns for different receivers.

Example Transmitter

Figure 5:
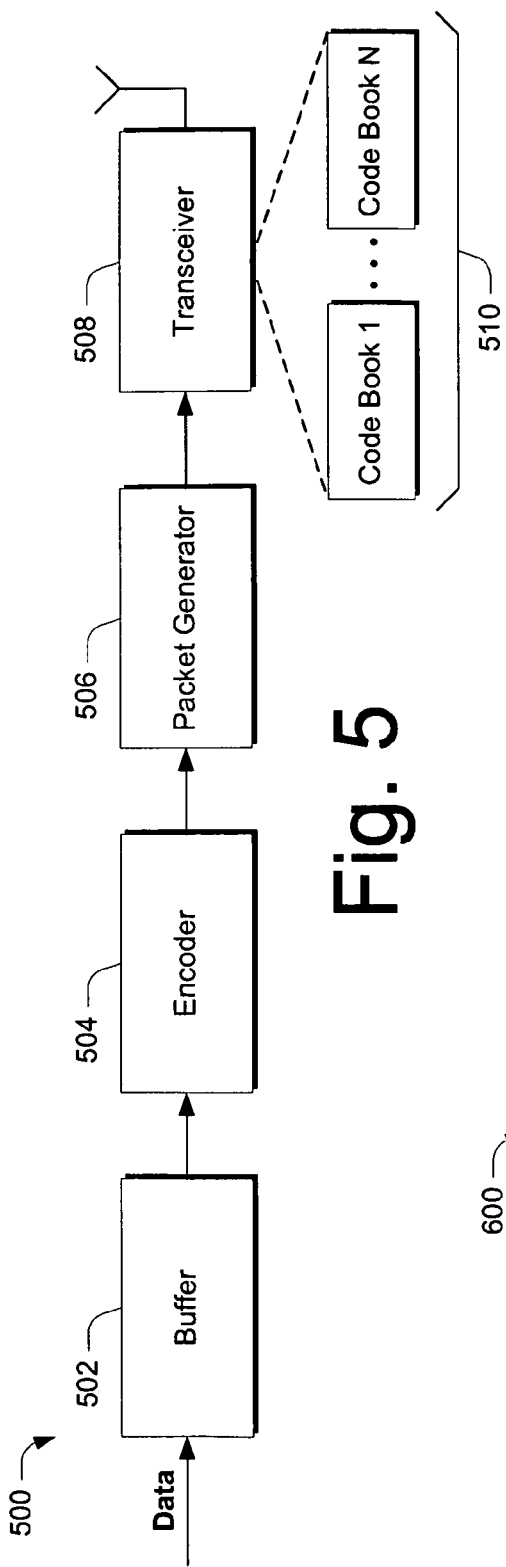
FIG. 5 illustrates an example transmitter in accordance with one or more embodiments.

FIG. 5 illustrates a transmitter, such as that embodied at base station 402 (FIG. 4), generally at 500 in accordance with one or more embodiments. In this example, transmitter 500 includes a buffer 502, an encoder 504, a packet generator 506, and a transceiver 508 including one or more antennas. The transceiver 508 includes a set of codebooks 510. Any suitable number of codebooks can be used. The codebooks are typically embodied on some type of computer-readable storage media.

Buffer 502 includes storage media such as random access memory for storing data that is to be transmitted to a receiver, such as one or more receivers (not shown). Buffer 502 is coupled with encoder 504, which is configured to encode the buffer data in any suitable encoding scheme.

Encoder 504 is communicatively coupled with packet generator 506. The packet generator includes circuitry and logic that constructs data packets that are to be transmitted to various receivers. The packet generator is coupled with transceiver 508, which is configured to transmit the data packets to the various receivers, as will be understood by the skilled artisan.

The set of codebooks 510 can be used to allocate individual codes books to individual receivers within a particular cell. The codebooks each provide a set of precoding vectors which define coefficients that are utilized to provide a beam pattern. By using the different codebooks, different beam patterns can be defined. The different codebooks can then be assigned or allocated to different receivers within the cell in order to reduce interference between transmitted signals by virtue of using different beam patterns for different receivers.

Example Receiver

Figure 6:
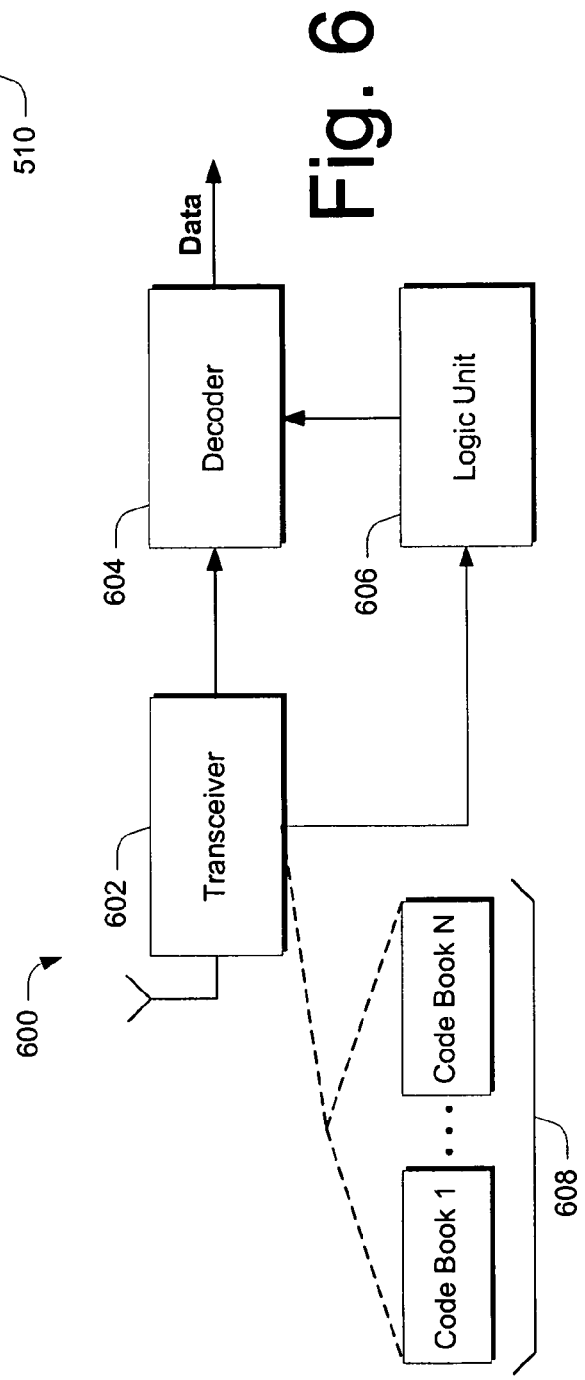
FIG. 6 illustrates an example receiver in accordance with one or more embodiments.

FIG. 6 illustrates a receiver, generally at 600, in accordance with one or more embodiments. The illustrated receiver represents a receiver, such as receivers 404, 406, and 408 in FIG. 4. In this example, receiver 600 includes a transceiver 602, a decoder 604, and a logic unit 606. In addition, the receiver includes or otherwise has access to a set of codebooks 608. Codebook set 608 includes the same codebooks that are included in codebook set 510 (FIG. 5). The codebooks are typically embodied on some type of computer-readable storage media.

In the illustrated and described embodiment, transceiver 602 is one that can operate in compliance with any suitable wireless or cellular standard, such as those named above and others.

Transceiver 602 is configured to receive transmitted packets from a transmitter, such as that shown in FIG. 5. Transceiver 602 is communicatively coupled to decoder 604 and provides received packets to the decoder for decoding in accordance with usual operations which will be understood by the skilled artisan.

Logic unit 606 is configured with a microprocessor controller and logic to facilitate decoding operations. Decoder 604 outputs data that has been decoded.

In operation, the base station can select, from its set of codebooks, a particular codebook for a particular receiver. The base station then notifies the receiver of the particular codebook which is then used for transmissions to and from the receiver. The base station can use any suitable criteria upon which to base its selection of a particular codebook for a particular receiver. For example, in some embodiments, the base station may dynamically assign codebooks to receivers based upon knowledge that the receiver is within an associated cell. Alternately or additionally, the base station may take into account criteria associated with the geographical proximity of receivers. That is, the base station may acquire information that describes the physical locations of the receivers within a particular cell. Using the information, the base station can then make codebook allocations. Some examples of how this can be done are provided just below.

Implementation Example

Figure 7:
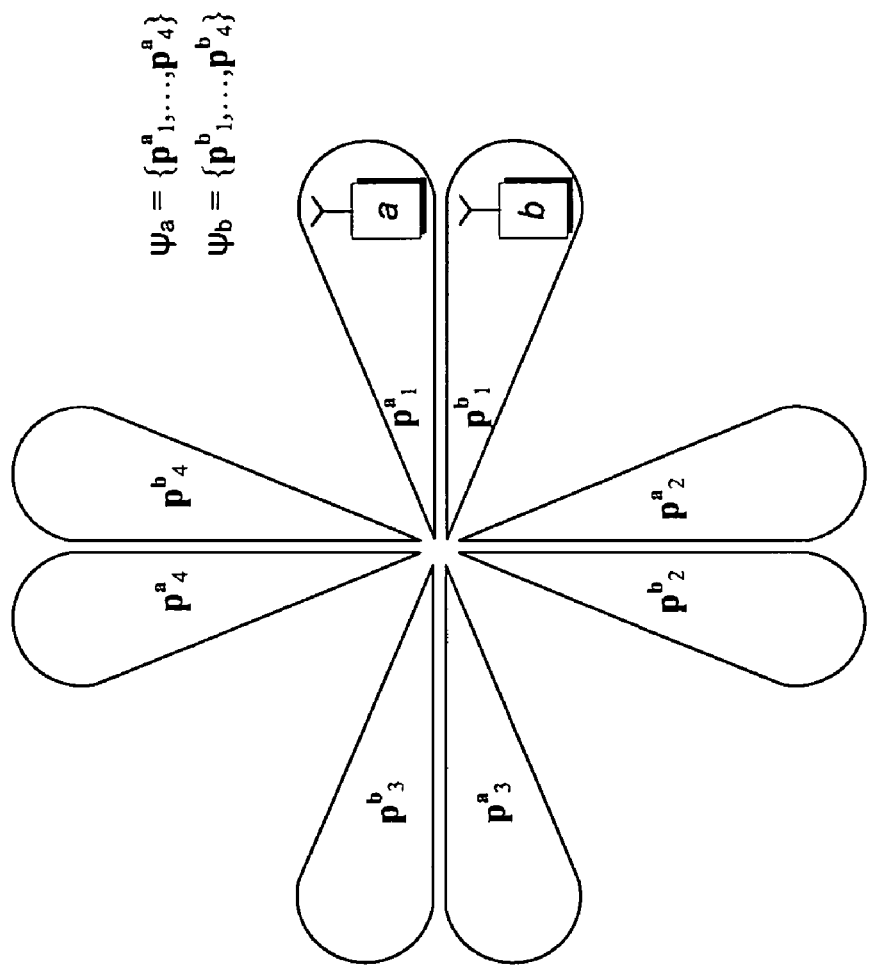
FIG. 7 illustrates transmission using multiple codebooks in accordance with one or more embodiments.

FIG. 7 illustrates a system in accordance with one or more embodiments. Here, two different codebooks are used. The codebooks are represented as follows:

$$\psi_a = \{p_1^a, \ldots, p_4^a\}$$
$$\psi_b = \{p_1^b, \ldots, p_4^b\},$$

where p represents a beam-forming or precoding vector.

In one or more embodiments, the different codebooks are designed and allocated by the base station to different receivers, such as mobile receivers, in a dynamic fashion. In at least some embodiments, the codebooks are designed to be generally orthogonal or non-overlapping in angular space, thereby increasing the separation between receivers that use the different codebooks. Codebooks can be allocated in any suitable fashion using any suitable method examples of which are described just below.

Figure 8:
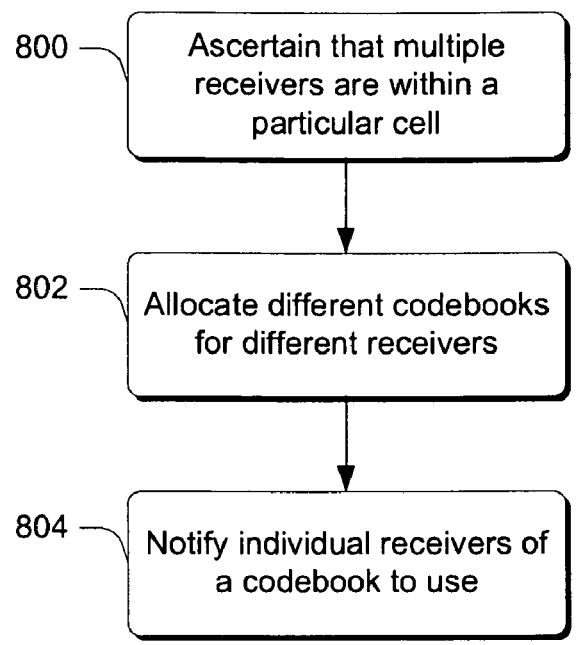
FIG. 8 is a flow diagram that describes steps in a method in accordance with one or more embodiments.

FIG. 8 is a flow diagram that describes a method in accordance with one embodiment. The method can be implemented in connection with any suitable hardware, software, firmware, or combination thereof. In at least some embodiments, the method can be implemented, at least in part, by a base station such as those that are described above.

Step 800 ascertains that multiple receivers are within a particular cell. This step can be performed in any suitable way. For example, a base station can maintain a list of receivers that are located within an associated cell. Step 802 allocates different codebooks for different receivers. This step can be performed by a base station selecting a particular codebook relative to a group of receivers in a manner that is directed to reducing associated interference with transmissions that occur using a codebook. Step 804 notifies individual receivers of a codebook to use. This step can be performed by transmitting an index of an associated codebook to a particular receiver. Once the particular codebook is known to the receiver, transmissions between the base station and an associated receiver can be conducted using the codebook to select particular beam patterns for transmissions.

Figure 9:
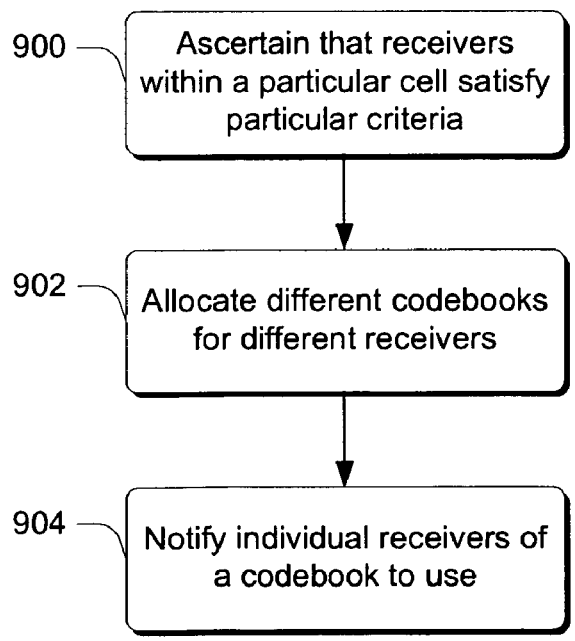
FIG. 9 is a flow diagram that describes steps in a method in accordance with one or more embodiments.

FIG. 9 is a flow diagram that describes a method in accordance with one embodiment. The method can be implemented in connection with any suitable hardware, software, firmware, or combination thereof. In at least some embodiments, the method can be implemented, at least in part, by a base station such as those that are described above.

Step 900 ascertains that receivers within a particular cell satisfy particular criteria. Any suitable criteria can be used. For example, such criteria can include the geographical proximity of the receivers relative to one another. Any suitable method can be used to ascertain the geographical proximity of the receivers. For example, in at least some embodiments, the base station can detect, using multiple antennas, whether the uplink signals of individual receivers have similar angles of arrival. Alternately or additionally, GPS techniques can be used in cases where receivers are equipped with GPS hardware. If step 900 ascertains that receivers within a particular cell satisfy the particular criteria, step 902 allocates different codebooks for different receivers. This step can be performed by a base station selecting a particular codebook relative to a group of receivers in a manner that is directed to reducing associated interference with transmissions that occur using a codebook. Step 904 notifies individual receivers of a codebook to use. This step can be performed by transmitting an index of an associated codebook to a particular receiver. Once the particular codebook is known to the receiver, transmissions between the base station and an associated receiver can be conducted.

Figure 10:
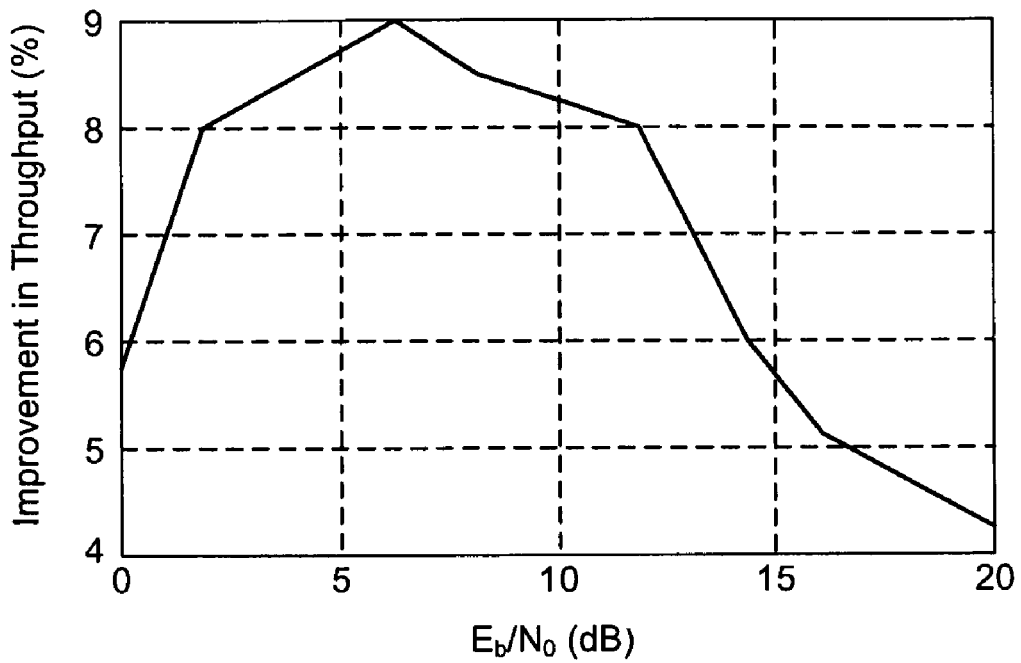
FIG. 10 is a graph that illustrates throughput improvements using multiple codebooks in accordance with one or more embodiments.

FIG. 10 is a graph that shows an example improvement in throughput that can be achieved through the use of precoding using multiple different codebooks. Multi-user MIMO systems with multiple codebooks can reduce interference and increase spatial diversity. This improves throughput because users with less interference can support more aggressive MCSs (modulation and coding schemes) and thus more data can be encoded and transmitted.

Example Receiver Environments

Referring now to FIGS. 11-14, various example implementations of receiver environments are shown. The various receiver environments can utilize the techniques described above.

Figure 11:
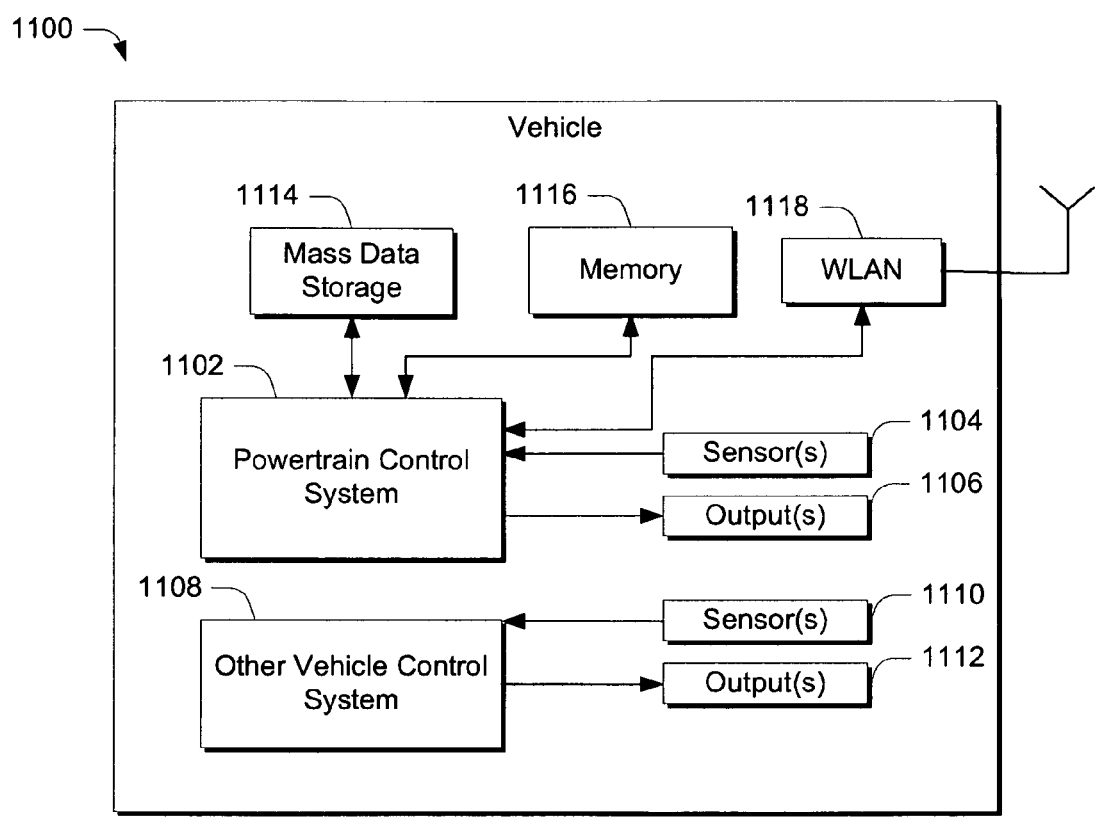
FIGS. 11-14 illustrate example receivers in accordance with one or more embodiments.

Referring now to FIG. 11, a receiver may be implemented as part of a communication system of a vehicle 1100, a WLAN interface 1118 and/or mass data storage 1114 of the vehicle control system. In some implementations, a powertrain control system 1102 receives inputs from one or more sensors 1104 such as temperature sensors, pressure sensors, rotational sensors, airflow sensors, and/or any other suitable sensors that generate one or more output control signals 1106, such as engine operating parameters, transmission operating parameters, and/or other control signals.

A receiver can be embodied in other control systems 1108 of vehicle 1100. Control system 1108 may likewise receive signals from input sensors 1110 and/or output control signals 1112 to one or more output devices. In some implementations, control system 1108 may be part of an anti-lock braking system (ABS), a navigation system, a telematics system, a vehicle telematics system, a lane departure system, an adaptive cruise control system, a vehicle entertainment system such as a stereo, DVD, compact disc, and the like. Still other implementations are contemplated.

Powertrain control system 1102 may include mass data storage 1114 that stores data in a nonvolatile manner. Mass data storage 1114 may include optical and/or magnetic storage devices for example hard disk drives HDD and/or DVDs. The magnetic storage device may be a mini HDD that includes one or more platters having a diameter that is smaller than approximately 1.8". Powertrain control system 1102 may be connected to memory 1116 such as RAM, ROM, low latency nonvolatile memory such as flash memory, and/or other suitable electronic data storage. Powertrain control system 1102 also may support connections with a WLAN via a WLAN network interface 1118. The control system 1108 may also include mass data storage, memory, and/or a WLAN interface (all not shown).

Figure 12:
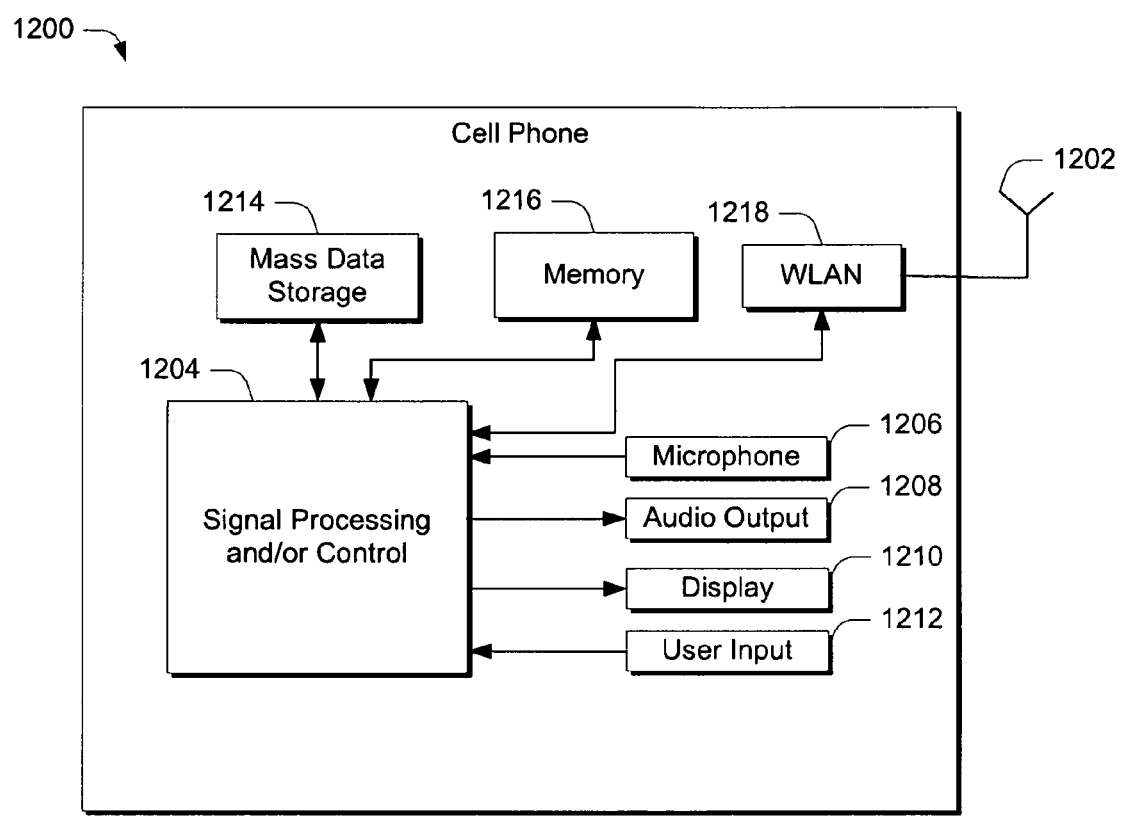

Referring now to FIG. 12, the receiver may be embodied in a cellular phone 1200 that may include a cellular antenna 1202. The receiver may be implemented in connection with either or both signal processing and/or control circuits, which are generally identified in at 1204, a WLAN interface 1218, and/or mass data storage of the cellular phone 1200. In some implementations, cellular phone 1200 includes a microphone 1206, an audio output 1208 such as a speaker and/or audio output jack, a display 1210 and/or an input device 1212 such as a keypad, pointing device, voice actuation, and/or other input device. Signal processing and/or control circuits 1204 and/or other circuits (not shown) in cellular phone 1200 may process data, perform coding, decoding and/or encryption, perform calculations, format data, and/or perform other cellular phone functions.

Cellular phone 1200 may include mass data storage 1214, which stores data in a nonvolatile manner such as optical and/or magnetic storage devices for example hard disk drives HDD and/or DVDs. The magnetic storage device may be a mini HDD that includes one or more platters having a diameter that is smaller than approximately 1.8". Cellular phone 1200 may be connected to memory 1216 such as RAM, ROM, low latency nonvolatile memory such as flash memory, and/or other suitable electronic data storage. Cellular phone 1200 also may support connections with a WLAN via a WLAN network interface 1218.

Figure 13:
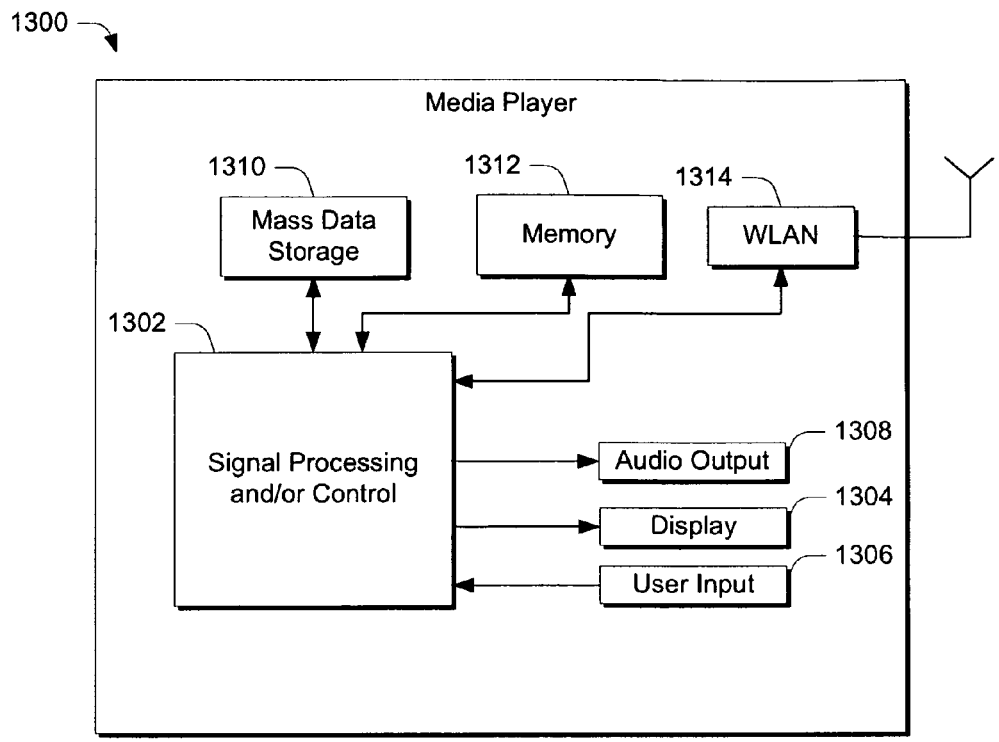

Referring now to FIG. 13, a receiver may be embodied in a media player 1300 and may be implemented in connection with either or both signal processing and/or control circuits, which are generally identified at 1302, a WLAN interface 1314, and/or mass data storage 1310 of the media player 1300. In some implementations, media player 1300 includes a display 1304 and/or a user input 1306 such as a keypad, touchpad, and the like. In some implementations, media player 1300 may employ a graphical user interface (GUI) that typically employs menus, drop down menus, icons, and/or a point-and-click interface via display 1304 and/or user input 1306. Media player 1300 further includes an audio output 1308 such as a speaker and/or audio output jack. Signal processing and/or control circuits 1302 and/or other circuits (not shown) of media player 1300 may process data, perform coding, decoding and/or encryption, perform calculations, format data, and/or perform any other media player function.

Media player 1300 may include mass data storage 1310 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The magnetic storage device may be a mini HDD that includes one or more platters having a diameter that is smaller than approximately 1.8". Media player 1300 may be connected to memory 1312 such as RAM, ROM, low latency nonvolatile memory such as flash memory, and/or other suitable electronic data storage. Media player 1300 also may support connections with a WLAN via a WLAN network interface 1314.

Figure 14:
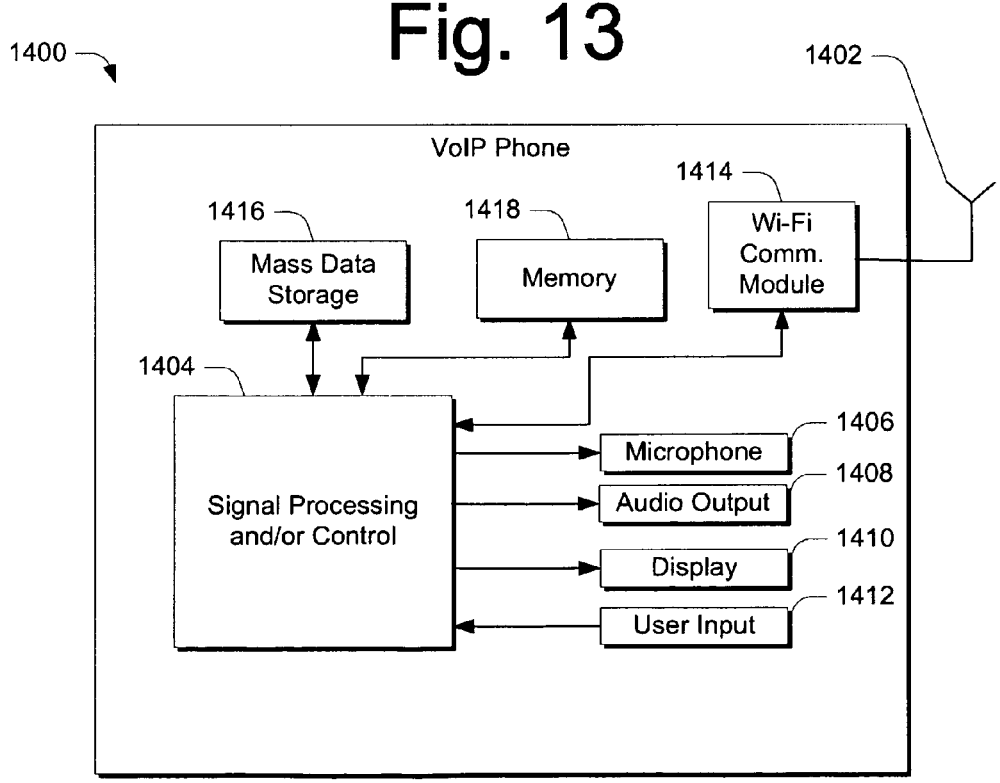

Referring to FIG. 14, a receiver may be embodied in connection with a Voice over Internet Protocol (VoIP) phone 1400 that may include an antenna 1402 or, alternately or additionally, in connection with a VoIP box that enables a conventional telephone to be plugged in and utilized with VoIP technology. The receiver may be implemented in connection with either or both signal processing and/or control circuits, which are generally identified at 1404, a wireless interface 1414, and/or mass data storage 1416 of the VoIP phone 1400. In some implementations, VoIP phone 1400 includes, in part, a microphone 1406, an audio output 1408 such as a speaker and/or audio output jack, a display monitor 1410, an input device 1412 such as a keypad, pointing device, voice actuation, and/or other input devices, and a Wireless Fidelity (Wi-Fi) communication module 1414. Signal processing and/or control circuits 1404 and/or other circuits (not shown) in VoIP phone 1400 may process data, perform coding, decoding and/or encryption, perform calculations, format data, and/or perform other VoIP phone functions.

VoIP phone 1400 may include mass data storage 1416 that stores data in a nonvolatile manner such as optical and/or magnetic storage devices, for example hard disk drives HDD and/or DVDs. The magnetic storage device may be a mini HDD that includes one or more platters having a diameter that is smaller than approximately 1.8". VoIP phone 1400 may be connected to memory 1418, which may be a RAM, ROM, low latency nonvolatile memory such as flash memory, and/or other suitable electronic data storage. VoIP phone 1400 is configured to establish communications link with a VoIP network (not shown) via Wi-Fi communication module 1414. Still other implementations in addition to those described above are contemplated.

Conclusion

In one or more embodiments, a cellular system utilizes different codebooks of precoding vectors for different receivers within a particular cell. A set of different codebooks is designed and then used by a base station as a basis to allocate to various receivers in a dynamic fashion. In at least some embodiments, the codebooks are designed to be non-overlapping in angular space. For example, codebooks can be designed to be generally orthogonal to one another thereby increasing the separation between receivers that use the different codebooks.

In at least some embodiments, codebooks can be allocated responsive to a determination that two or more receivers are geographically proximate one another in a manner which would permit an undesirable amount of interference. In yet other embodiments, codebooks can be allocated in a more random fashion.

In at least some embodiments, the approach outlined above can ensure that codebooks of the individual receivers do not increase in size, which allows performance to be improved without the need for additional feedback or higher complexity during precoder selection.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
a base station configured to transmit data via beam patterns to a plurality of receivers within a cell associated with the base station;
multiple different codebooks, each codebook providing a set of pre-coding vectors useful to provide the beam patterns for transmitting the data to the receivers within the cell; and
wherein the base station is further configured to determine geographical proximity of the receivers by detecting that uplink signals associated with individual receivers have similar angles of arrival and to allocate, based on the geographical proximity of the receivers, different codebooks to geographically proximate receivers within the cell, the different codebooks useful to provide low interference beam patterns for transmitting the data to the geographically proximate receivers.

2. The system of claim 1, wherein at least some of the codebooks are designed to be generally orthogonal in angular space to at least some other codebooks.

3. The system of claim 1, wherein at least some of the receivers are mobile receivers.

4. The system of claim 1, wherein the base station is further configured to select codebooks for the geographically proximate receivers in a manner that attempts to reduce interference in transmissions to the geographically proximate receivers.

5. The system of claim 1, wherein the base station is further configured to convey codebook information to corresponding receivers.

6. The system of claim 1, wherein the base station is further configured to convey a codebook index to one of the geographically proximate receivers.

7. The system of claim 1, wherein the base station is further configured to receive global positioning system (GPS) data from the receivers and to ascertain geographical proximity of the receivers based on the GPS data.

8. The system of claim 1, wherein at least one receiver comprises a vehicle, a cell phone, or a VoIP phone.

9. A method comprising:
ascertaining that a plurality of receivers are within a particular cell;
determining geographical proximity of the receivers within the cell by detecting that uplink signals associated with individual receivers have similar angles of arrival;
allocating, based on the geographical proximity of the receivers, different codebooks to geographically proximate receivers within the cell, each codebook providing a set of pre-coding vectors useful to provide beam patterns for transmitting data within the cell, the different codebooks useful to provide low interference beam patterns for transmitting the data to the geographically proximate receivers; and
notifying the geographically proximate receivers of the different codebooks that are to be used.

10. The method of claim 9, wherein at least some of the different codebooks are designed to be generally orthogonal in angular space to at least some others of the different codebooks.

11. The method of claim 9, wherein at least some of the geographically proximate receivers are mobile receivers.

12. The method of claim 9, wherein said allocating is performed in a manner that attempts to reduce interference in transmissions to receivers that are geographically proximate to one another.

13. The method of claim 9, further comprising receiving GPS data from the receivers within the cell and ascertaining geographical proximity of the receivers based on the GPS data.

14. The system of claim 1, wherein the low interference beam patterns are useful to increase throughput of data transmitted to receivers that are geographically proximate.

15. A method comprising:
determining that a first receiver within a cell is geographically proximate to a second receiver within the cell by detecting that uplink signals received from the first receiver and uplink signals received from the second receiver have similar angles of arrival; and
allocating, responsive to determining that the first receiver is geographically proximate to the second receiver, a first codebook to the first receiver that is different from a second codebook allocated to the second receiver, the first and second codebooks each providing a set of pre-coding vectors useful to provide low interference beam patterns for respective transmissions to the first and second receivers.

16. The method of claim 15, further comprising receiving GPS data from the first receiver or the second receiver and wherein determining that the first receiver is geographically proximate the second receiver uses the GPS data.

17. The method of claim 15, wherein the first codebook is generally orthogonal in angular space to the second codebook.

18. The method of claim 15, wherein the first receiver or the second receiver is a mobile receiver.

19. The method of claim 15, further comprising conveying respective codebook information associated with the different codebooks to the first receiver or the second receiver.

20. The method of claim 15, wherein said allocating reduces interference in transmissions to the first receiver and the second receiver.

* * * * *